United States Patent [19]

Nattel

[11] 4,447,030
[45] May 8, 1984

[54] ELECTRICAL WIRING BOX ARRANGEMENT

[75] Inventor: William Nattel, Montreal, Canada

[73] Assignee: Commander Electrical Materials, Inc., St. Jean, Canada

[21] Appl. No.: 248,933

[22] Filed: Mar. 30, 1981

[51] Int. Cl.³ .............................................. G12B 9/00
[52] U.S. Cl. ............................. 248/27.1; 248/DIG. 6
[58] Field of Search ............ 248/205.1, DIG. 6, 27.1; 174/58; 220/3.9

[56] References Cited

U.S. PATENT DOCUMENTS

| | | | |
|---|---|---|---|
| 1,225,525 | 5/1917 | Sweet | 248/DIG. 6 |
| 1,814,449 | 7/1931 | Morgenstern | 248/DIG. 6 |
| 2,374,622 | 4/1945 | Rugg | 174/58 |

OTHER PUBLICATIONS

"Pitt–Line Illustrated Catalog 177-R"; published by The Pitt Manufacturing Co.; published Jan. 1977.

*Primary Examiner*—J. Franklin Foss
*Attorney, Agent, or Firm*—Larson and Taylor

[57] ABSTRACT

An electrical wiring box arrangement particularly adapted for mounting on a metal support structure such as a U-shaped or I-shaped metal dry-wall stud includes an L-shaped mounting bracket with deformable leg portions and a wiring box. The wall structure of the box is provided with attachment tabs and the bracket with a number of correspondingly positioned tab-receiving openings which permit flush mounting of the wiring box arrangement with a variety of thicknesses of drywall panel.

The legs of the mounting bracket are easily deformed by hand around the flanges of the metal stud permitting the mounting of the wiring box arrangement to either side of the stud and to metal studs of a variety of depths.

5 Claims, 6 Drawing Figures

ELECTRICAL WIRING BOX ARRANGEMENT

BACKGROUND OF THE INVENTION

This invention relates to electrical wiring boxes and brackets for mounting to supporting structures. More particularly, it is concerned with electrical wiring box and bracket arrangements for mounting to metal studding.

A number of mounting brackets of different design for mounting electrical wiring boxes to supporting structures such as metal studs are well-known to those skilled in the art. By way of example, mounting brackets have been utilized or described in the prior art which variously include features such as clips for securely gripping the edges or flanges of metal studs (for example, U-shaped or C-shaped studs); teeth, prongs or barbs for biting into flange portions or interior portions of metal studs; resilient snap-on gripping members or slotted members arranged for attachment to interior portions, edges or flanges of metal studs; tabs arranged to be bent around edges or flanges of studs and to be secured thereto; spring-loaded members capable of being flexed by hand to permit their insertion into the interior of studs; and members arranged to be secured to studs by fastening devices such as self-tapping metal screws and nut-and-bolt arrangements.

Many of the brackets of the prior art avoid the need for installation tools, even simple and commonplace tools such as pliers and screwdrivers, and some of the brackets are adjustable, or removable by hand once mounted to studs.

While the prior art mounting brackets having the above-described features appear to offer reasonable solutions to the problem of mounting wiring boxes to metal studs, they nonetheless have certain drawbacks and disadvantages when employed in some applications. Many of the brackets, for example, are very complex in design, difficult to install, require close manufacturing tolerances and are difficult to manufacture at low cost, particularly if the brackets have multiple parts or numerous bends or intricate shapes and require special treating such as welding or heat-treating.

Certain of the brackets are usable with studs of only a single depth and many of the brackets cannot be used on either side of a stud or with studs of an I-shaped cross-section. Further, the avoidance of installation tools in several instances is accomplished at the expense of complexity and intricacy of design without significant reduction, if at all, of the labor and cost expended in the installation process.

Moreover, many of the prior art brackets attach to the wiring box at one position only so that when the assembly is mounted to a metal stud, the open face of the wiring box projects forward of the stud by a single, fixed predetermined distance. The result is that the bracket positions the open box face to be flush with only one standard thickness of wallboard attached to the stud in subsequent steps of construction.

SUMMARY OF THE INVENTION

In accordance with the present invention, an improved wiring box arrangement for mounting on metal supporting structures such as metal studs is provided which avoids the drawbacks and disadvantages associated with the prior art arrangements briefly described hereinabove.

The mounting brackets of wiring box arrangements in accordance with the present invention are of one-piece design, strong and sturdy, do not require close manufacturing tolerances, have few bends and no intricate shapes, can be manufactured at low cost, for example, out of sheet metal using standard well-known stamping and metal working techniques, and require no special treating such as welding or heat treatment.

Attachment of the wiring box to the bracket of wiring box arrangements in accordance with the present invention is simple and straightforward, and permits attachment of the box to the bracket in a number of positions to ultimately accommodate wallboard of a variety of thicknesses.

Mounting the wiring box and bracket arrangement to supporting structures such as metal studs is likewise accomplished in a simple and straightforward manner by hand without requiring an installation tool. The wiring box and mounting bracket arrangements in accordance with the present invention can be used with metal studs of varying depth and can be used on either side of studs such as those of I-shaped cross-section.

Electrical wiring box arrangements in accordance with the present invention are adapted for mounting on metal supporting structures of the type having substantially parallel first and second flange portions with a web portion disposed therebetween, the first and second flange portions of the metal supporting structure each have first and second edge corner regions. Examples of such supporting structures include metal dry wall studs of U-shaped or I-shaped cross-section.

The wiring box arrangement includes an electrical wiring box and a mounting bracket. The wiring box comprises front-to-rear walls with a rear wall therebetween which together define a chamber with a forward opening adapted to receive a wiring device. The front-to-rear wall structure of the box includes attachment means for attaching the box to the bracket in any one of several individually selectable positions.

The wiring box arrangement further includes a mounting bracket for attachment to the wiring box and for mounting the assembly to a metal supporting structure. The mounting bracket has first and second deformable leg portions disposed to form a substantially right angle with one another.

The first leg portion of the bracket has a plurality of sets of spaced apart openings adapted to coact with the attachment means of the wiring box wall structure to attach the box to the bracket and to position the front-to-rear wall structure of the box extending beyond the second leg portion of the bracket.

The second leg portion is adapted to be positioned against the first flange portion of the metal supporting structure between the first and second corner regions thereof in preparation for mounting the bracket to the supporting structure. The second leg portion of the bracket, when so positioned, is arranged initially to extend past the first corner region of the first flange portion of the supporting structure and, when deformed, to conform generally to the configuration of and embrace the first corner region of the first flange portion.

The first leg portion is adapted to be positioned against the second corner region of the first flange portion and against the second corner region of the second flange portion, the first leg portion thus positioned to lie between the first and second flange portions substantially parallel with the web portion of the supporting structure. The first leg portion of the bracket, when thus positioned, is arranged initially to extend past the second corner region of the second flange portion and, when deformed, to conform generally to the second corner region of the second flange portion.

When thus deformed, the balance of the length of the first leg portion of the mounting bracket is positioned against the second flange portion of the supporting structure between the first and second corner regions thereof, and is arranged initially to extend beyond the first corner region and, when deformed, to conform generally to the configuration of and embrace the first corner region of the second flange portion of the supporting structure.

The wiring box arrangement is thus caused to be firmly mounted to said supporting structure with the plane of the forward opening of the wiring box projecting and spaced apart from the plane of the first flange portion of the supporting structure.

For a better understanding of the present invention, together with other and further objects, advantages and capabilities thereof, reference is made to the following disclosure and claims in connection with the above-described drawings.

DETAILED DESCRIPTION

Figure 1:
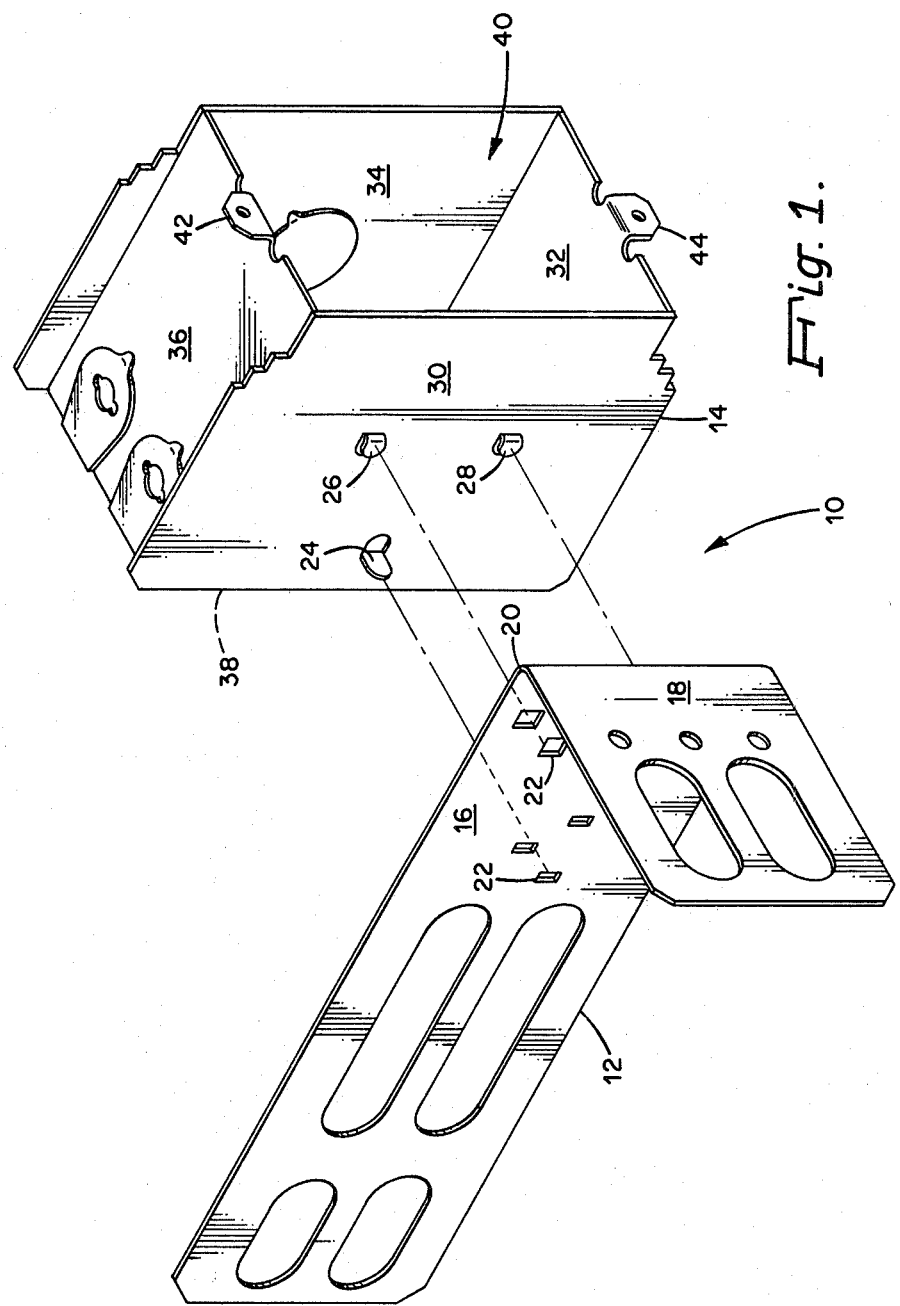
FIG. 1 is an exploded perspective view of an electrical wiring box arrangement in accordance with the invention.
Figure 2:
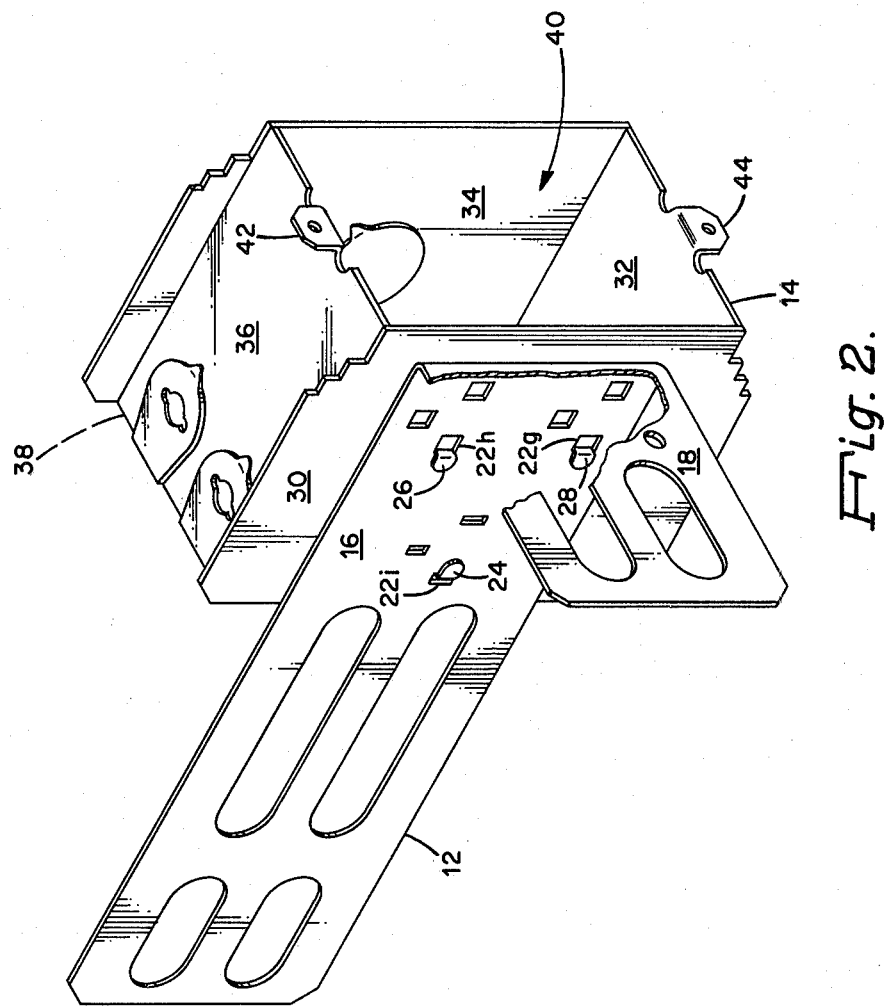
FIG. 2 is a partially cut-away perspective view of the electrical wiring box arrangement of FIG. 1 showing attachment of the wiring box to the bracket.
Figure 3:
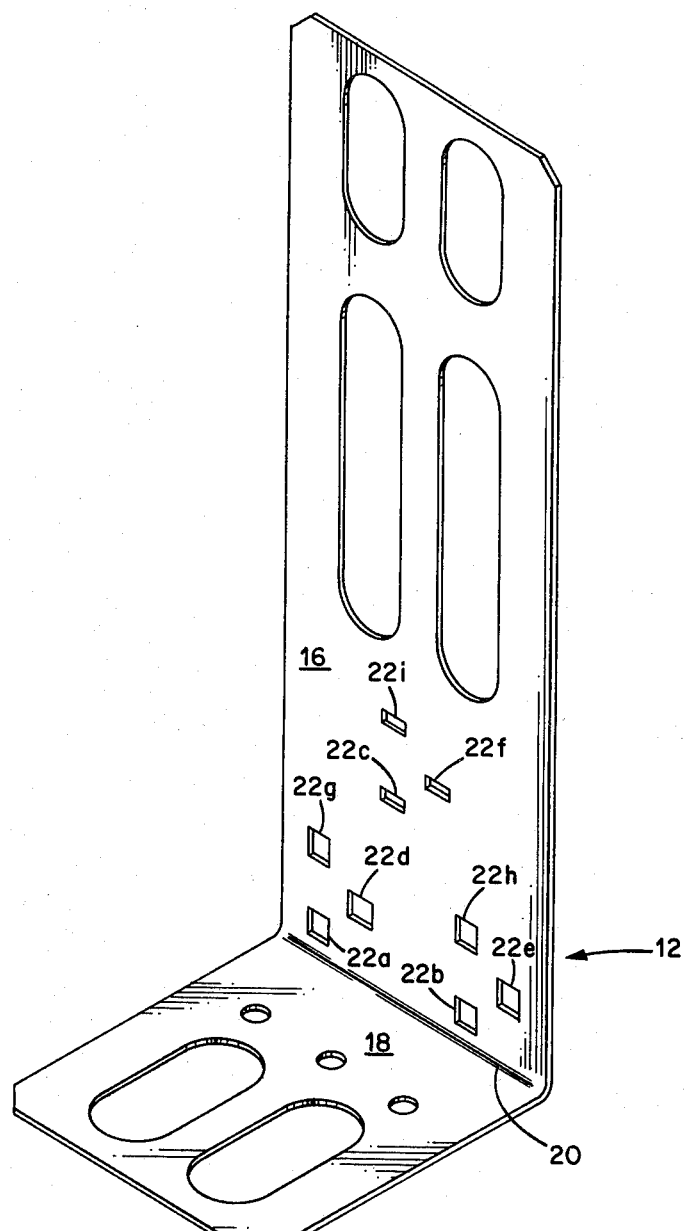
FIG. 3 is a perspective view of the bracket of the electrical wiring box arrangement of FIG. 1.

An electrical wiring box arrangement in accordance with the invention is shown in FIGS. 1-3. The arrangement 10 includes a generally L-shaped bracket 12 and a wiring box 14.

The electrical wiring box 14 includes front-to-rear walls 30, 32, 34, and 36 with rear wall 38 which, together, form a chamber within the box with a forward opening 40 for receiving an electrical wiring device such as a switch or plug receptacle (not shown) to be mounted to tabs 42 and 44.

The mounting bracket 12 comprises two deformable leg portions 16 and 18 which meet to form a substantially right angle at vertex 20. The first leg portion 16, forming the longer of the two leg portions includes a number of tab-receiving openings 22 at the end of the leg portion 16 nearest the vertex 20. As indicated in the exploded view of FIG. 1, the tab-receiving openings 22 of bracket leg portion 16 are adapted to receive attachment tabs 24, 26, and 28 in a front-to-rear wall 30 of wiring box 14.

As can best be seen by referring to FIG. 3, in a preferred embodiment, the tab receiving openings 22 are arranged in sets or triads of triangular arrangements of slots. Slotted openings 22a, 22b and 22c form one such set of triangularly arranged openings, openings 22d, 22e, and 22f form a second set of triangularly arranged tab-receiving openings and openings 22g, 22h and 22i form a third such set.

Referring again to FIG. 1, it can be seen that each triangularly arranged triad of tab-receiving openings 22 in bracket leg portion 16 is arranged to correspond to the positioning of attachment tabs 24, 26, and 28 in the wall 30 of wiring box 14. The two tabs 26 and 28 nearest the front opening 40 of the wiring box 14 are shown formed in an L-shaped configuration, while the third tab 24 of the set is initially substantially perpendicular to box wall 30.

The two tab-receiving openings adapted to receive tabs 26 and 28 are generally larger than the opening adapted to receive tab 24, permitting the box wall tabs to easily pass through the tab-receiving openings. The box is thus easily attached to the bracket as can best be seen by referring to FIG. 2. The bracket 12 is placed against box wall 30, aligning tabs 26 and 28 with the two larger tab-receiving openings of a triad, for example openings 22g and 22h of the bracket 12. The bracket is then slideably moved in a direction toward the front opening 40 of the box which causes the third tab-receiving opening of the triad, for example opening 26i, to become aligned with tab 24 of the box wall 30. The tab 24 is inserted in the opening 22i and bent over to securely attach the box to the bracket.

As can readily be seen in FIG. 2, the box 14 can be similarly attached to bracket 12 by employing any of the sets of triangularly disposed sets of tab-receiving openings. While any number of such sets of openings can be provided in bracket 12, in a preferred embodiment of the invention, three sets of openings are provided to accommodate the three standard thicknesses of dry-wall paneling commonly employed in building construction: ⅜ inch, ½ inch, and ⅝ inch. That is, tabs 24, 26 and 28 of the box wall 30 and tab-receiving openings 22g, 22h and 22i of the bracket are so positioned that when the box 14 is attached to the bracket 12, the plane of the forward opening 40 of the box projects forward of the plane of bracket leg portion 18 by about ⅝ inch. In this configuration, the wiring box and mounting bracket arrangement can be conveniently employed in construction applications where ⅝ inch dry-wall panel is used. In such applications, when the arrangement is mounted to a dry-wall stud as detailed below, the plane of the forward opening 40 of the wiring box will be substantially flush with the finished face of the dry-wall panel.

Referring to FIG. 3, the triad of tab-receiving openings 22d, 22e and 22f and the triad of openings 22a, 22b, and 22c are correspondingly positioned to allow for attaching the box to the bracket with ½ inch and ⅜ inch spacing, respectively, between the plane of the forward opening 40 of the box and the plane of bracket leg portion 18.

The wiring box arrangement of the present invention is particularly adapted for mounting on metal supporting structures of the types having two substantially parallel flanges with a web connecting the two flanges. Examples include metal studs of C-shaped or U-shaped cross-section where the web is disposed between the two flanges, connecting the corner edge of one flange to the corresponding corner edge of the other flange, or metal stud of I-shaped cross-section where the web is centrally disposed between the two flanges.

Figure 4:
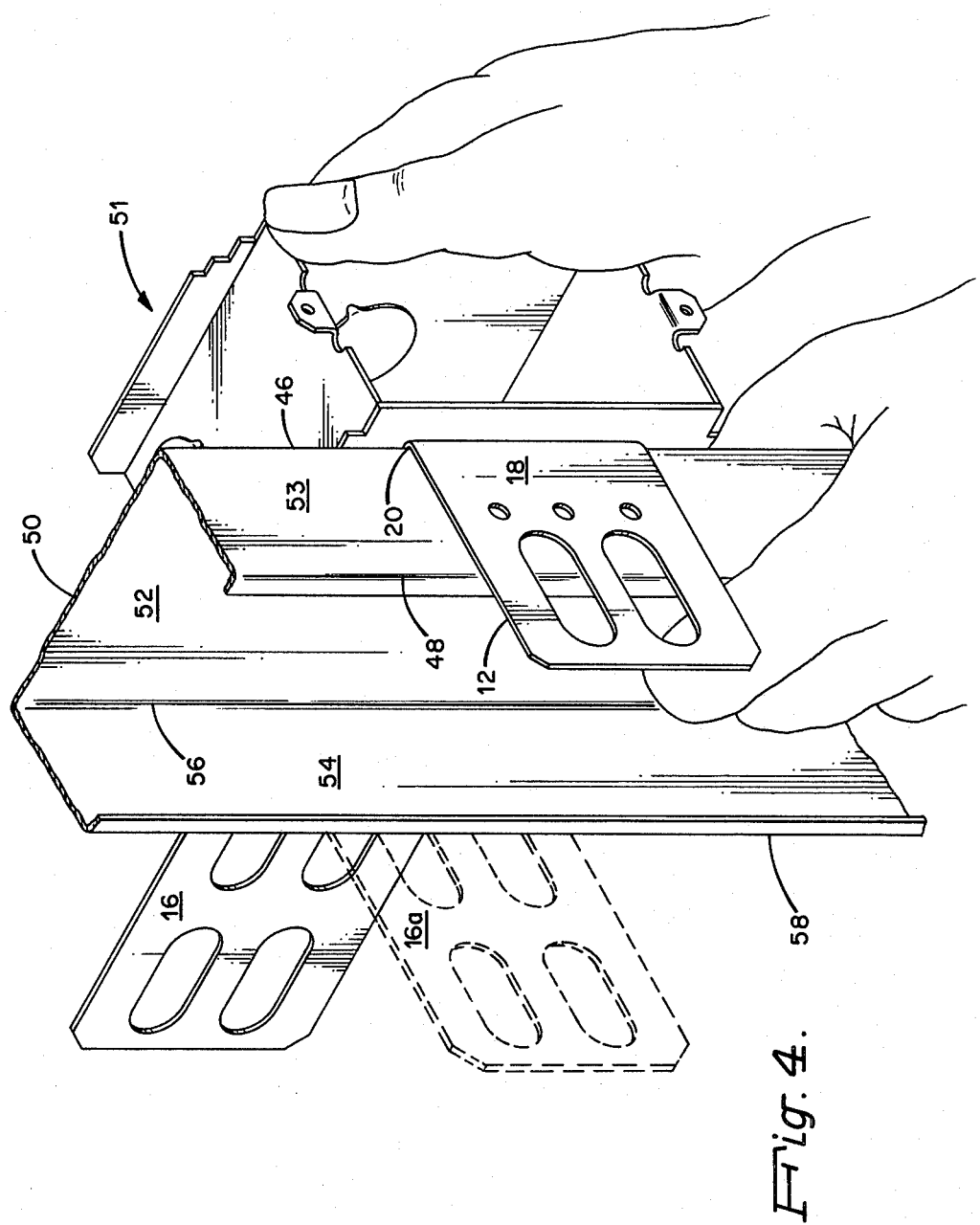
FIGS. 4 and 5 illustrate, in perspective, attachment of the wiring box arrangement of FIG. 1 to a metal support structure of U-shaped cross-section.
Figure 5:
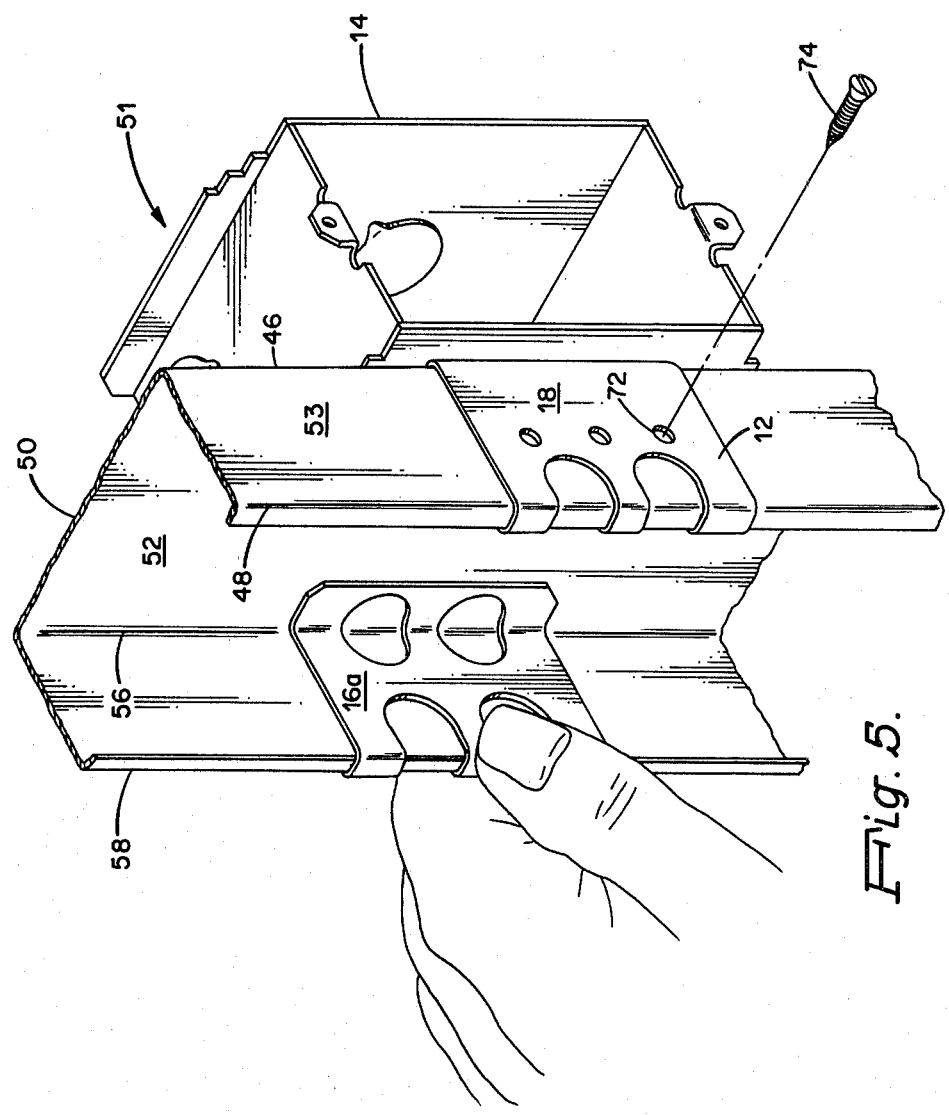
Figure 6:
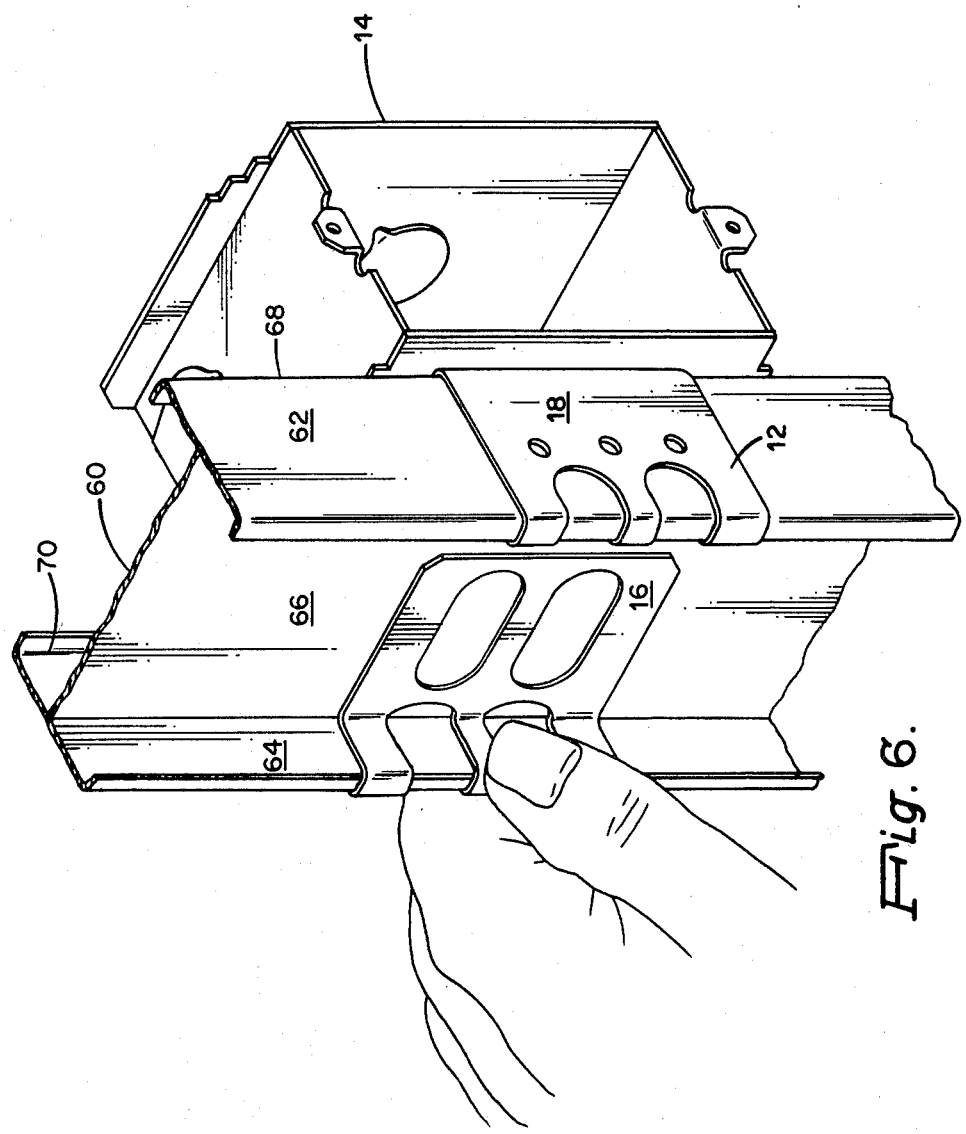
FIG. 6 illustrates, in perspective, attachment of the wiring box arrangement of FIG. 1 to a metal support structure of I-shaped cross-section.

The bracket and attached wiring box are conveniently and easily mounted to such metal studding as depicted in FIGS. 4-6. Referring to FIG. 4, the wiring box assembly 51 is placed against the U-shaped stud 50 with the vertex 20 of the bracket 12 placed firmly against the second corner 46 of the first flange 53 of the stud 50. In this position the bracket 12 is positioned in preparation to mounting on the stud so that the second leg portion 18 of the bracket 12 lies against the first flange 53 of the stud between the first corner 48 and the second corner 46 of the flange 53. The second leg portion 18 of the bracket is constructed about 2 inches to about 3 inches in length so that when so positioned, it initially extends beyond the first corner 48 of the first flange 53 of the stud 50.

Referring to FIG. 5 it can be seen that deformation of the first leg portion 18 of the bracket causes it to conform to and grip or engage the first corner 48 of the flange 53.

Referring again to FIG. 4, placement of the wiring box assembly against the stud in preparation to mounting it on the stud causes the first leg portion 16 of the bracket to lie between the second corner 46 of the first flange 53 and the second corner 56 of the second flange 54, substantially parallel to web 52. In this initial position, the first leg portion 16 of the bracket extends beyond the second corner 56 of the second flange 54. Deformation of leg portion 16 of the bracket causes the leg portion to conform to the second corner 56 of the second flange 54 and to lie along the second flange 54 between the first corner 58 and the second corner 56 as depicted by the dashed lines and numberal 16a. In this position, the balance of the leg portion, depicted as 16a in FIG. 4, extends beyond the first corner 58 of the second flange 54.

The first leg portion 16 of the bracket is constructed about 5½ inches to about 6½ inches in length to accommodate the standard depths of metal dry-wall studding commonly employed in building construction: 1⅝ inches, 2½ inches, and 3⅝ inches. If the first leg portion 16 of the bracket is about 6 inches in length, it is long enough to be used with the largest of standard dry-wall studding, that of 3⅝ inches depth.

Referring to FIG. 5, the balance 16a of bracket leg portion 16 which initially extended beyond first corner 58 of the second flange 54, when deformed, conforms to and grips or engages corner 58. When used with studding of 1⅝ inch or 2½ inch depth, the excess length of the first leg portion 16 of the bracket is folded inside the stud.

FIG. 6 depicts the use of the wiring box arrangement with metal support structure having an I-shaped cross-section. The second leg portion 18 of bracket 12 engages the first flange 62 and the first leg portion 16 of the bracket engages second flange 64. The wiring box assembly is thus firmly attached to the support structure notwithstanding the fact that the bulk of first leg portion 16 spans the open gap between second corner 68 of the first flange 62 and second corner 70 of the second flange 64.

In a preferred embodiment of the invention, the bracket is fabricated of a light gauge metal such as 22 gauge steel or the like. This permits the leg portions of the bracket to be easily deformed by hand, in turn permitting the wiring box arrangement to be mounted to a metal structure by hand without the need for tools.

As shown in FIG. 5, the second leg portion 18 of the bracket is provided with fastener-receiving holes 72 to receive a screw 74, rivet, bolt or like fastener to provide optional additional means for securing the bracket to the support structure.

The present invention thus provides an electrical wiring box arrangement of simple design which can be easily and inexpensively manufactured with a minimum of steps. The wiring box arrangement can be conveniently and quickly mounted to a metal support structure such as a metal stud by hand without the need for any tools. The arrangement permits the mounting of a wiring box across the open channel face of an I-shaped stud.

The wiring box arrangement of this invention can be used with a variety of depths of metal studding. It also permits flush mounting of electrical wiring boxes with a variety of thicknesses of dry-wall panel.

While there has been shown and described what is at present considered the preferred embodiment of the invention, it will be obvious to those skilled in the art that various changes and modifications may be made therein without departing from the scope of the invention as defined by the appended claims.

What is claimed is:

1. An electrical wiring box arrangement for mounting on a metal supporting structure of the type having substantially parallel first and second flange portions and a web portion disposed therebetween, said flange portions each having first and second corner regions, the wiring box arrangement comprising:

an electrical wiring box having front-to-rear walls and a rear wall therebetween defining a chamber with a forward opening adapted to receive a wiring device; and a mounting bracket for attachment to said wiring box and for mounting to said metal supporting structure, said mounting bracket having first and second deformable leg portions disposed to form a substantially right angle with one another;

said first leg portion having a plurality of sets of spaced apart openings adapted to coact with attachment means disposed in said front-to-rear wall structure of said wiring box to attach said wiring box to said mounting bracket with the plane of said forward opening of said box spaced apart and projecting forward of the plane of said second leg portion of said mounting bracket by a selected one of a like plurality of distances;

said second leg portion adapted to be positioned against said first flange portion of said metal supporting structure between said first and second corner regions thereof in preparation for mounting said bracket to the supporting structure, said second leg portion arranged initially to extend past said first corner region of said first flange portion of said metal supporting structure and, when deformed, to conform generally to the configuration of and embrace said first corner region of said first flange portion;

said first leg portion adapted to be positioned against said second corner region of said first flange portion and against said second corner region of said second flange portion, said first leg portion thus positioned to lie between said first and said second flange portions substantially parallel with said web portion, said first leg portion arranged initially to extend past said second corner region of said second flange portion of said metal supporting structure and, when deformed, to conform generally to the configuration of said second corner region of said second flange portion;

the balance of the length of said first leg portion of said mounting bracket thus being positioned against said second flange portion of said supporting structure between said first and said second corner regions thereof, the balance of said first leg portion arranged initially to extend past said first corner region of said second flange portion and, when deformed, to conform generally to the configuration of and embrace said first corner region of said second flange portion of said supporting structure;

whereby said wiring box arrangement is caused to be firmly mounted to said supporting structure with the plane of said forward opening of said wiring box projecting and spaced apart from the plane of said first flange portion of said supporting structure.

2. An electrical wiring box arrangement in accordance with claim 1 wherein said plurality of set of openings in said first leg portion consists of three spaced apart triads of openings in said first leg portion positioned to coact with said attachment means disposed in the wall structure of said box to attach said box to said mounting bracket with the plane of said forward opening of said box projecting forward of the plane of said second leg portion of said bracket by any one of three predetermined distances.

3. An electrical wiring box arrangement in accordance with claim 2 wherein said predetermined distances are about $\frac{3}{8}$ inch, $\frac{1}{2}$ inch, and $\frac{5}{8}$ inch.

4. An electrical wiring box arrangement in accordance with claim 1 wherein said first leg portion of said bracket is between about 5½ inches to about 6½ inches in length.

5. An electrical wiring box arrangement in accordance with claim 4 wherein said second leg portion of said bracket is between about 2 inches to about 3 inches in length.

* * * * *